(No Model.)

A. A. KLEIN.
HOISTING MACHINE.

No. 345,309. Patented July 13, 1886.

Attest
Homer A. Herr
E. M. Breckinreid

Inventor
Adolph A. Klein
By his atty.

UNITED STATES PATENT OFFICE.

ADOLPH ALBERT KLEIN, OF PHILADELPHIA, PENNSYLVANIA.

HOISTING-MACHINE.

SPECIFICATION forming part of Letters Patent No. 345,309, dated July 13, 1886.

Application filed June 1, 1885. Serial No. 167,191. (No model.)

*To all whom it may concern:*

Be it known that I, ADOLPH ALBERT KLEIN, of the city and county of Philadelphia, and State of Pennsylvania, have invented a new and useful Improvement in Hoisting-Machines, of which the following is a specification.

My invention has reference to elevators or hoisting-machines; and it consists in certain improvements, all of which are fully set forth in the following specification, and shown in the accompanying drawings, which form part thereof.

The object of this invention is to provide suitable clutch mechanism which shall come into play upon stopping the rotation of power-shaft to automatically arrest the lifting-drum or its shaft and prevent the cage or the cable from running down, no matter how great a load it may be supporting.

Figure 1:
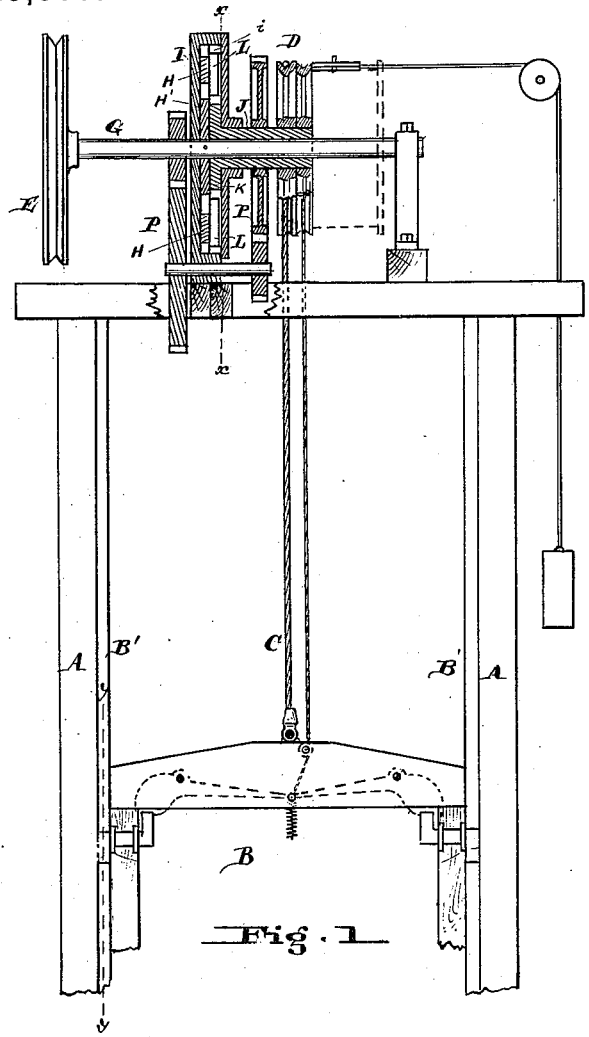
Figure 2:
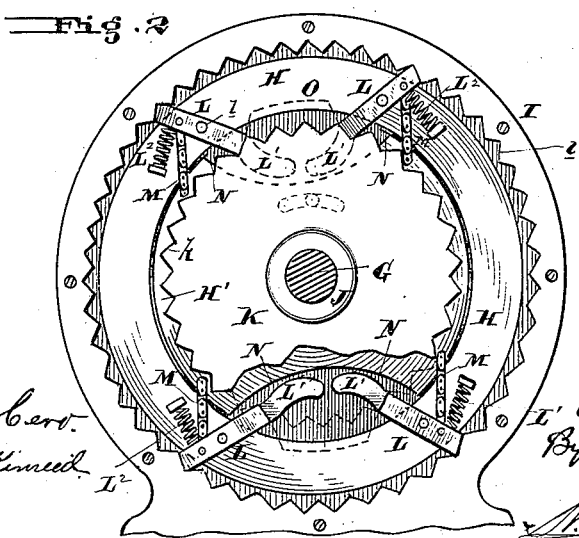

In the drawings, Figure 1 is an elevation of a hoisting-machine embodying my improvements, showing the clutch mechanism in section. Fig. 2 is a cross-section of the clutch mechanism for preventing the cage running down, on line *x x*.

A are the vertical guide-posts.

B is the cage, and B' are the guides by which it is guided vertically.

C is the lifting-cable and passes over the lifting drum or sheave D.

E is the power-wheel and is secured to the drive or power shaft G, which passes through the clutch-case I and is supported in suitable bearings.

The drum D is secured to a sleeve, J, loosely journaled upon the shaft G, and carries on its inner end a toothed disk, K, the teeth *k* of which point toward the internal teeth, *i*, on the stationary clutch-section of case I.

H is an annular or ring-shaped disk which works within the case I and carries the pawls L, which are pivoted thereto by pivots *l*, and which pawls are pressed in contact with the teeth *i k* by springs L². These pawls are preferably four in number, though two will suffice, and are arranged in pairs pointing in opposite directions, so that when said clutches are in position (indicated in Fig. 2) the disk K and its drum D cannot rotate in either direction.

Secured to the shaft G is a disk, H', having the cam edges N, which, when rotated in either direction, strike the heel-extension L' on one or the other of the pawls L. These pawls are also connected to the said disk H' by chains M, the said chains, heel-extensions, and cams being so arranged that the rotation of the disk H' in either direction will cause all of the pawls to be withdrawn from the teeth and allow the lifting-drum to be rotated. In the case of a power-elevator, and where great lifting capacity is required, connecting-gearing P, between the shaft G and the sleeve J, may be employed, whereby a large number of revolutions of the shaft G will make a small number of revolutions to the drum D.

In operating, the first movement of the shaft G is to cause the pawls L to be withdrawn from the teeth *i* and *k*, and then, through the agency of the gearing, to rotate the drum D. The instant, however, the shaft G stops the pawls will readjust themselves between the teeth and prevent any further revolution of the lifting-drum, be it to raise or lower the cage.

Where the machine is to operate by a hoisting-rope directly or in the case of dumb-waiters, and where the lifting-drum would rotate at the same velocity as the driving-shaft, then the gearing P would be dispensed with and that portion of the disk K between two adjacent pawls L would be raised, as indicated at O, in which case the pawls would never be free from the disk K, but would catch or be free from the teeth *i* of the stationary case, the effect being substantially the same as that hereinbefore described, only in this case the power is transmitted from the shaft G through the pawls to the lifting-drum. It is evident that in this case the pawls might be pivoted to the disk K in place of the ring H. In place of the chains M links may be employed.

While I prefer the construction shown, the details thereof may be modified in various ways without departing from my invention.

I am aware of the patent to Wright, No. 297,330 of 1884, and claim nothing therein set forth or claimed.

Having now described my invention, what I claim as new, and desire to secure by Letters Patent, is—

1. A stationary toothed section, in combination with a power-shaft, lifting-drum, and connecting pawl or clutch mechanism actuated by said power-shaft to connect or disconnect the drum with the fixed section, whereby when the power-shaft stops rotating the lifting-drum is locked in position, and connecting-gearing by which the power-shaft may run at a higher velocity than the drum, substantially as and for the purpose specified.

2. A stationary toothed section, in combination with a power-shaft, a lifting-drum having a toothed segment secured thereto, and pawl mechanism adapted to catch between the teeth on the fixed section and drum to stop the rotation of the latter, and projections attached to the power-shaft and acting upon said pawl, by which the power-shaft in starting to rotate first automatically unlatches the lifting-drum and then rotates it, or vice versa, substantially as and for the purpose specified.

3. A stationary toothed section, in combination with a power-shaft, a lifting-drum having a toothed segment secured thereto, and clutch mechanism adapted to catch between the teeth on the fixed section and drum to stop the rotation of the latter, projections attached to the power-shaft and acting upon said pawls, by which the power-shaft in starting to rotate first automatically unlatches the lifting-drum, and then rotates it, or vice versa, and connecting-gearing between the power-shaft and drum, by which the former may run at a higher velocity than the latter to gain power, substantially as and for the purpose specified.

4. The combination of power-shaft G with disk H' secured thereto, stationary toothed section I, disk H, drum D, drum-sleeve $d$, having toothed disk K, one or more pawls, L, and connecting devices to actuate said pawls from shaft G or its disk, whereby they are caught or freed from the teeth of the stationary section, substantially as and for the purpose specified.

5. The combination of power-shaft G with disk H' secured thereto, stationary toothed section I, disk H, drum D, drum-sleeve J, having toothed disk K, one or more pawls, L, pivoted to the ring H and having parts L', and connecting devices, consisting of chains or links M, cams N, and springs $L^2$, to actuate said pawls from shaft G or its disk, whereby they are caught or freed from the teeth of the stationary section, substantially as and for the purpose specified.

6. The combination of power-shaft G with disk H' secured thereto, stationary toothed section I, disk H, drum D, drum-sleeve J, having toothed disk K, one or more pawls, L, and connecting devices to actuate said pawls from shaft G or its disk, whereby they are caught or freed from the teeth of the stationary section, and gearing P, connecting the power-shaft G with the lifting-drum, substantially as and for the purpose specified.

In testimony of which invention I hereunto set my hand.

ADOLPH ALBERT KLEIN.

Witnesses:
R. M. HUNTER,
WILLIAM C. MAYNE.